UNITED STATES PATENT OFFICE.

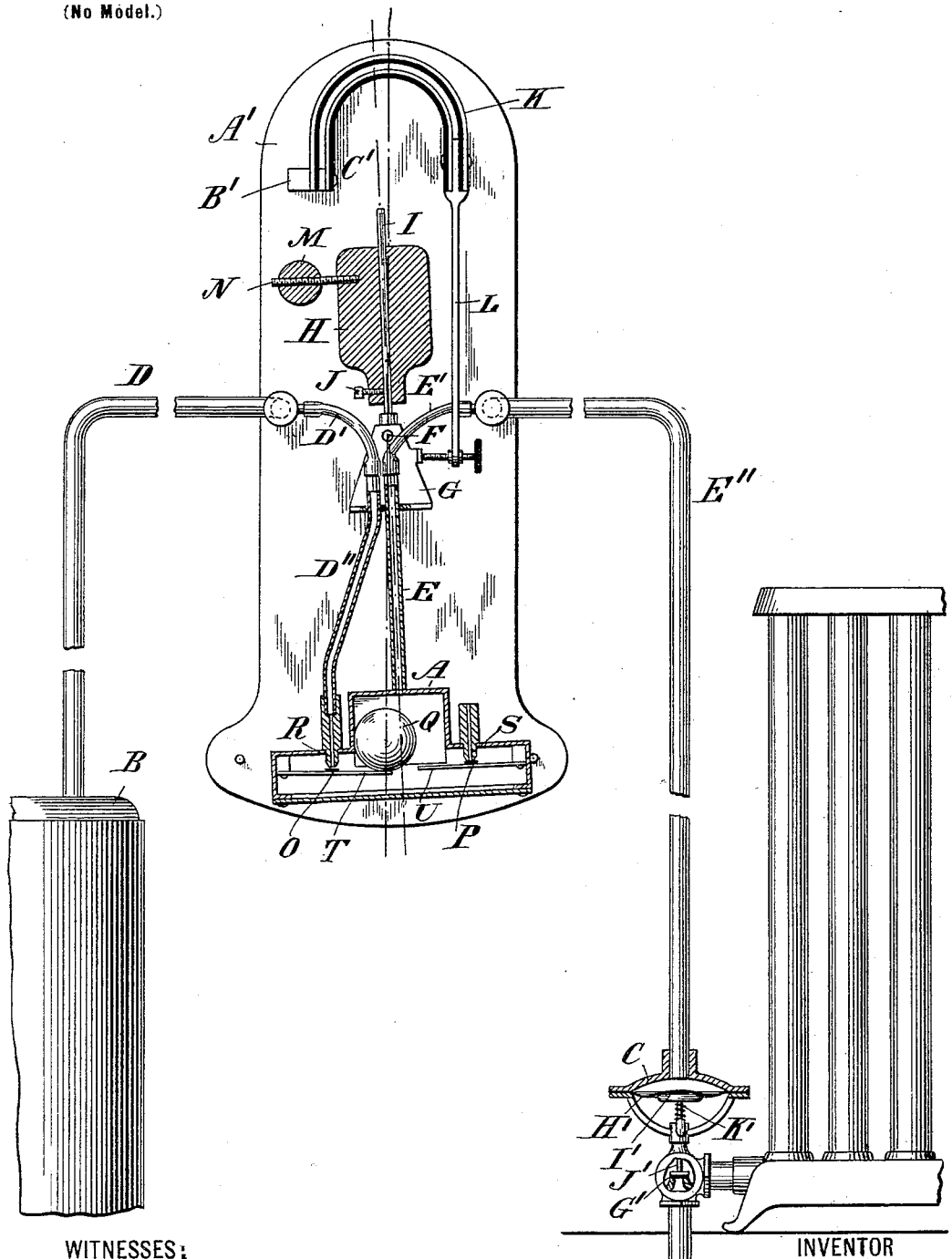

ALFRED ROESCH, OF BRIDGEPORT, CONNECTICUT, ASSIGNOR TO THE DAVIS & ROESCH TEMPERATURE CONTROLLING COMPANY, OF NEW JERSEY.

AUTOMATIC TEMPERATURE-REGULATOR.

SPECIFICATION forming part of Letters Patent No. 625,518, dated May 23, 1899.

Application filed March 2, 1898. Serial No. 672,251. (No model.)

*To all whom it may concern:*

Be it known that I, ALFRED ROESCH, a citizen of the United States of America, and a resident of Bridgeport, county of Fairfield, and State of Connecticut, have invented certain new and useful Improvements in Automatic Temperature-Regulators, of which the following is a specification.

My invention relates to improvements in that class of automatic temperature-regulators in which compressed air is employed to actuate steam-controlling valves and a thermostat is employed to actuate the air-controlling valves.

It is a well-known fact that while under some conditions—for example, when heating through air by indirect radiation—it is desirable to reverse the temperature-controlling valves by a slow gradual movement, while under other circumstances, as when heating with steam, it is desirable to actuate the steam-controlling valves with a quick positive movement.

The object of my present improvement is to provide a device by which when the temperature has been raised to the desired point the steam-controlling valves will be instantly closed and also by which when the temperature is lowered but slightly such valves will in like manner be opened with a quick positive movement.

The construction of my device is explained by reference to the accompanying drawing, which represents a front view thereof, part in section.

The several parts of my device are referred to by the usual reference-letters.

A represents a vibratory valve-chamber through and by which compressed air from the air-reservoir B is led and controlled in its passage to and from the valve-controlling diaphragm-chamber C. Air is led from the air-reservoir B to the valve-chamber A through the stationary duct D, flexible duct D', and swinging duct D''. The flexible duct D' permits of a slight vibratory movement of said valve-chamber A as the same is actuated by the movement of the thermostat K. The thermostat K is rigidly affixed at one end to the base-plate A' by the supporting-block B' and bolt C' and is provided at its free end with an actuating-arm L.

Air passes from the valve-chamber A to the diaphragm-chamber C through the swinging duct E, flexible duct E', and stationary duct E''. The flexible duct E' also yields to the vibratory movement of said valve-chamber A. The valve-chamber A is suspended from a supporting-pivot F by the swinging ducts D'' and E and connecting-block G, to which said swinging ducts D'' and E are rigidly secured.

To facilitate the movement of the valve-chamber A and to cause the same to move with greater ease and a more positive movement, a counterpoise H is provided, which is supported from the connecting-block G above the pivotal support F by the standard I and set-screw J, so as to counterbalance the valve-chamber A and the contiguous parts located upon the same side of the pivotal support therewith.

The valve-chamber A is so counterpoised that when not resisted by the actuating-arm L it will be swung past the center of gravity toward the right, as shown. When, however, the free arm of the thermostat is caused by a change of temperature to move toward the left, motion is communicated therefrom through the intermediate bearings to the valve-chamber, whereby the same is moved in the opposite direction toward the left. To facilitate in counterbalancing said valve-chamber A so as to be promptly thrown toward the right when relieved from the action of the thermostat, I have provided a secondary counterpoise M, which for convenience of adjustment is supported from the side of the counterpoise H upon a screw-threaded rod N, whereby it is obvious that by screwing said counterpoise M toward the left it will cause the valve-chamber A to be swung toward the right, as indicated in the drawing.

The passage of air through the valve-chamber A is controlled by the inlet air-valve O and the outlet air-valve P, which valves O and P when relieved from the weight of the actuating-ball Q are respectively retained against the respective inlet and outlet ports R and S by the spring supporting-bars T and U. The ball Q is free to roll toward the right and left from the one spring supporting-bar to the other as said valve-chamber A is moved in either direction past the center of gravity. It will be obvious that when the valve-chamber A is swung toward the right, as shown, the ball Q will be caused to roll of its own gravity from the spring-bar U to the spring-bar T, whereby the spring-bar U will be thrown upward by its own elasticity, thereby closing the outlet-port S, while the spring-bar T will be forced downward by the gravity of said ball, whereby the valve-port R is opened. Thus it is obvious that air from the air-reservoir B will be free to pass through the ducts D D' D'' into the valve-chamber A and from thence out through the connecting-ducts E, E', and E'' to the diaphragm-chamber C, whereby the steam-controlling valve G' will be closed, motion being communicated thereto by the compressed air in the chamber C, through the diaphragm H', diaphragm-bar I', and valve-stem J' in the ordinary manner. When by the action of the thermostat the valve-chamber A is thrown toward the left, the ball Q will be caused to roll of its own gravity from the valve-supporting spring-bar T to the valve-supporting spring-bar U, whereby the inlet valve-port R will be closed, thus preventing the further escape of air from the air-reservoir B, when the valve-port S will be opened as the spring-bar U is thrown downward by the gravity of the ball Q thereon, whereby the air which has passed through said valve-chamber to the diaphragm-chamber C will be permitted to escape through said valve-port S, thus relieving the steam-valve G from the action of the compressed air, whereby said valve will be opened by the recoil of the spiral spring K' in the ordinary manner. It will be obvious that by the construction shown but one of said valve-ports R or S will be opened at a time—in other words, that the outlet-port S will always be closed, thereby preventing waste of air before the inlet-port R is opened, and, vice versa, that said inlet-port R will be closed before the outlet-port S is opened, thereby insuring the greatest possible economy in the use of compressed air.

Having thus described my invention, what I claim as new, and desire to secure by Letters Patent, is—

1. In a temperature-regulator, the combination of a vibratory valve-chamber; an inlet air-duct forming a communication between said valve-chamber and an air-reservoir; an outlet air-duct forming a communication from said valve-chamber with the diaphragm-chamber of a steam-controlling valve; an inlet and an outlet air-controlling valve, both located within said valve-chamber and provided with elastic supporting-bearings, by which said valves are automatically thrown in contact with their respective seats; a spherical weight or ball located in said valve-chamber and adapted, as said chamber is vibrated toward the right and left, to roll of its own gravity, from one side of said valve-supporting bearings to the other whereby said valves are alternately opened and closed by the gravity of said weight; and a thermostat adapted, as it is moved by varying changes of temperature, to actuate said vibratory valve-chamber, substantially as and for the purpose specified.

2. In a temperature-regulator, the combination of a vibratory valve-chamber; an inlet air-duct forming a communication between said valve-chamber and an air-reservoir; an outlet air-duct forming a communication from said valve-chamber with the diaphragm-chamber of a steam-controlling valve; an inlet and an outlet air-controlling valve, both located within said valve-chamber and provided with elastic supporting-bearings, by which said valves are automatically thrown in contact with their respective seats; a spherical weight or ball located in said valve-chamber and adapted, as said chamber is vibrated toward the right and left, to roll of its own gravity, from one side of said valve-supporting bearings to the other, whereby said valves are alternately opened and closed by the gravity of said weight; a thermostat adapted, as it is moved by varying changes of temperature, to actuate said vibratory valve-chamber; a pivotal support from which said valve-chamber is suspended; and a counterpoise affixed to the bearings of said pivotal support upon the opposite side thereof, and adapted to counterbalance said vibratory valve-chamber, substantially as and for the purpose specified.

3. In a temperature-regulator, the combination of a vibratory valve-chamber; an inlet air-duct forming a communication between said valve-chamber and an air-reservoir; an outlet air-duct forming a communication from said valve-chamber with the diaphragm-chamber of a steam-controlling valve, said inlet and outlet air-ducts being provided with a flexible portion forming a communication between their respective stationary and swinging portions, which permit of the vibratory movement of said valve-chamber; an inlet and an outlet air-controlling valve, both located within said valve-chamber and provided with elastic supporting-bearings, by which said valves are automatically thrown in contact with their respective seats; a spherical weight or ball located in said valve-chamber and adapted, as said chamber is vibrated toward the right and left, to roll of its own gravity, from one side of said valve-supporting bearings to the other, whereby said valves are alternately opened and closed by the gravity of said weight; a thermostat adapted, as it is moved by varying changes of temperature, to actuate said vibratory valve-chamber; a pivotal support from which said valve-chamber is suspended; a counterpoise affixed to the bearings of said pivotal support upon the opposite side thereof; and a secondary counterpoise or weight, adjustably secured to the side of said first-named counterpoise, substantially as and for the purpose specified.

4. In a temperature-regulator, the combination of a vibratory valve-chamber; an inlet air-duct forming a communication between said valve-chamber and an air-reservoir; an outlet air-duct forming a communication from said valve-chamber with the diaphragm-chamber of a steam-controlling valve; said inlet and outlet air-ducts being provided with a flexible portion forming a communication between their respective stationary and swinging portions, which permit of the vibratory movement of said valve-chamber; an inlet and an outlet air-controlling valve, both located within said valve-chamber and provided with elastic supporting-bearings, by which said valves are automatically thrown in contact with their respective seats; a spherical weight or ball located in said valve-chamber and adapted, as said chamber is vibrated toward the right and left, to roll of its own gravity, from one side of said valve-supporting bearings to the other, whereby said valves are alternately opened and closed by the gravity of said weight; a thermostat adapted, as it is moved by varying changes of temperature, to actuate said vibratory valve-chamber; a pivotal support from which said valve-chamber is suspended; a counterpoise affixed to the bearings of said pivotal support upon the opposite side thereof; and a secondary counterpoise or weight, adjustably secured to the side of said first-named counterpoise, said actuating-thermostat being provided with an adjustable hand-screw, by which its action over said vibratory valve-chamber is adjusted and controlled, substantially as and for the purpose specified.

5. In a temperature-regulator the combination with a vibratory valve-chamber, having inlet and outlet ports, an exhaust-port, valves controlling said inlet and exhaust ports and normally closing said ports, a rolling weight or ball controlling the movement of said valves, and adapted to retain one or the other in open position as said valve-chamber is vibrated, of a thermostat adapted as it is moved by variations of temperature to vibrate said valve-chamber, substantially as described.

6. In a temperature-regulator the combination with a vibratory valve-chamber having inlet and outlet ports, an exhaust-port, valves controlling said inlet and exhaust ports and normally closing said ports, a rolling weight or ball controlling the movement of said valves and adapted to retain one or the other alternately in an open position as said valve-chamber is vibrated, of connections between said inlet-port and a fluid-reservoir, connections between said outlet-port and fluid-actuated mechanism, and a thermostat adapted as it is moved by the variations of temperature to vibrate said valve-chamber, substantially as described.

Signed by me, in the city, county, and State of New York, this 27th day of January, 1898.

ALFRED ROESCH.

Witnesses:
JAMES C. CHAPIN,
JNO. S. PARKER.